US012434269B2

(12) United States Patent
Gagliardi et al.

(10) Patent No.: US 12,434,269 B2
(45) Date of Patent: Oct. 7, 2025

(54) PLANT AND METHOD FOR CLASSIFYING SCRAP

(71) Applicant: DANIELI & C. OFFICINE MECCANICHE S.P.A., Buttrio (IT)

(72) Inventors: Nicola Gagliardi, Corno di Rosazzo (IT); Luca Mattinzioli, Marmirolo (IT); Andrea Pasut, Zoppola (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 18/546,345

(22) PCT Filed: Feb. 14, 2022

(86) PCT No.: PCT/IB2022/051285
§ 371 (c)(1),
(2) Date: Aug. 14, 2023

(87) PCT Pub. No.: WO2022/172238
PCT Pub. Date: Aug. 18, 2022

(65) Prior Publication Data
US 2024/0116084 A1    Apr. 11, 2024

(30) Foreign Application Priority Data

Feb. 15, 2021    (IT) .................. 102021000003347

(51) Int. Cl.
*B07C 5/344* (2006.01)
*B03C 1/30* (2006.01)
*B07C 5/02* (2006.01)

(52) U.S. Cl.
CPC .............. *B07C 5/344* (2013.01); *B03C 1/30* (2013.01); *B07C 5/02* (2013.01)

(58) Field of Classification Search
CPC ......... B07C 5/02; B07C 5/344; B07C 5/3425; B03C 1/30; B02C 1/10
(Continued)

(56) References Cited

U.S. PATENT DOCUMENTS 5,363,972 A * 11/1994 Gilmore .................. B07B 13/16
                                                       209/930
2009/0236268 A1    9/2009 Shulman
(Continued)

FOREIGN PATENT DOCUMENTS

JP    H0557251 A    3/1993
JP    H06263242 A    9/1994
(Continued)

OTHER PUBLICATIONS

Van Looy; Eric, "Method and Apparatus for Selecting and Analysing Bulk Material" (English Translation), Aug. 30, 2018, worldwide. espacenet.com (Year: 2018).*
(Continued)

*Primary Examiner* — Michael McCullough
*Assistant Examiner* — Molly K Devine
(74) *Attorney, Agent, or Firm* — Tutunjian & Bitetto, P.C.

(57) ABSTRACT

The invention is related to a plant for the classification of scrap according to its chemical composition. The plant contains a shear adapted to cut scrap; downstream of the shear an analyser of the chemical composition of the sheared material; means of transport, comprising a plurality of vibrating feeders and conveyors to transport the sheared material to the analyser; and a discharge system adapted to divide the material analysed according to its chemical composition. The shearing in a related method is followed by chemical analysis of the sheared material which allows its division into fractions of sheared scrap with different chemical compositions. The invention helps to optimise the feed-
(Continued)

ing of melting furnaces with different types of scrap which are distinguished, for example, by their copper content.

3 Claims, 5 Drawing Sheets

(58) Field of Classification Search
USPC .............................................................. 209/3
See application file for complete search history.

(56) References Cited

U.S. PATENT DOCUMENTS

| | | |
|---|---|---|
| 2010/0017020 A1 | 1/2010 | Hubbard-Nelson et al. |
| 2011/0240528 A1* | 10/2011 | Ruiz ....................... B02C 23/08 209/214 |
| 2018/0147607 A1 | 5/2018 | Comtois et al. |

FOREIGN PATENT DOCUMENTS

| | | |
|---|---|---|
| JP | 2009240846 A | 10/2009 |
| JP | 2011005429 A | 1/2011 |
| JP | 2019535491 A | 12/2019 |
| JP | 2020513547 A | 5/2020 |
| RU | 2180011 C2 | 2/2002 |
| SU | 1703299 A1 | 1/1992 |
| WO | 92/16312 A1 | 10/1992 |
| WO | WO-2018154151 A1 * | 8/2018 ............... B07C 5/02 |

OTHER PUBLICATIONS

International Search Report for PCT/IB2022/051285 dated May 10, 2022 (4 pages).
Written Opinion of the International Searching Authority for PCT/IB2022/051285 dated May 10, 2022 (5 pages).
Russian Search Report issued in corresponding Russian Patent Application No. 2023123360/12(051432) dated Apr. 17, 2024, pp. 1-2.
English Translation of Notification of Reasons for Rejection issued in corresponding Japanese Patent Application No. 2023-548899 dated Oct. 29, 2024 (p. 1-8).

* cited by examiner

PLANT AND METHOD FOR CLASSIFYING SCRAP

TECHNICAL FIELD

The invention relates to a plant and a method for classifying sheared scrap that makes it possible to divide types of scrap, distinguished by their chemical composition, in particular by their copper content, into different fractions. The plant and method may make use of various forms of shears and are not limited to scrap of any given sizes or weights.

DESCRIPTION OF RELATED ART

In a steel plant, scrap is the basis of the production process and its purchase is one of the main cost items, accounting alone for roughly 40% of the final product sold.

In common practice, scrap is divided into different subclasses according to weight, size and origin, and is extremely variable in terms of purity (and therefore price) depending on the percentage of iron contained therein: the lower the percentage of iron, the lower the quality of the scrap. Secondly, some elements, primarily copper and tin, must be removed as far as possible from the metal bath, since their concentration above certain thresholds leads to defects and qualitative decreases in the product. Two characteristics of purity are therefore integrated into the geometric and dimensional characteristics of the scrap, the second of these having an effect on what is termed "melt loss".

From a dimensional point of view, ferrous scrap can be divided into no less than four categories each of which is useful for balancing the baskets with which the melting furnaces are fed. In common practice, the classification of scrap is complex and depends on the local market. The following disclosure is thus based on a general and simplified case study.

An initial group that can be considered is that of shredder scrap, normally of small size containing inert contents and highly variable residues. It is therefore characterised by a high density when loaded in the basket and is normally used to compose the bottom thereof. This type of scrap derives mainly from the scrapping and crushing of motor vehicles, household appliances and municipal metal waste. Generally, crushing takes place in hammer mills or shredders, which crush all the components according as they are processed: this fragmentation leads to a large volume of small components, which are sorted using separating systems such as magnetic drums, eddy current carpets, air blowing devices, etc.

The output is therefore separated into mainly ferrous and non-ferrous materials and, if possible, divided between copper, aluminium and inert materials, including, if possible, light and heavy plastics.

A second category of scrap is that resulting from the demolition of buildings, where there is a mixture of material of varying sizes, variously agglomerated with remnants of concrete or similar, which is cut into transportable sections, but which can be quite large. This category may also include materials from collection or otherwise obsolescent scrap. This material is not particularly valuable and should be mixed with other more valuable materials and reduced in size (if necessary) to allow for proper filling of the baskets.

A third category of scrap is that derived from moulding and processing waste. In this case, the quality is high, the contaminants are limited and consequently the melt loss is low, while the remaining problem is the size of the pieces. In general, the moulding plates are of considerable size to maximise the number of pieces that can be made with each of them. Therefore, to become easily movable they must first be sectioned.

The fourth of the main categories of scrap is that consisting of scrap metal waste of considerable size, such as, for example, pylons, rails, structural beams, steel sheets and other material of considerable weight, requiring a cut made by high-performing mechanical machines. In this case, too, the quality of the scrap is generally good but the complexity of the transport is considerable. These are usually homogeneous and well defined categories of material that must be processed in order to allow for easy loading into the furnace.

As is known, a steel plant uses a variable number of baskets for each casting (on average between two and three). Alternatively, continuous loads are used by means of conveyor or vibrating belts.

However, the scrap fed to the melting furnaces is not always of the same type or in any case is inhomogeneous. It is common to mix the various categories of scrap described above in different percentages in order to dispose of them as uniformly as possible and to try and keep the charge mixture balanced in order to achieve constant melting times. The loaded material shall have the following characteristics:
- facilitate an easy process of loading the furnace by reducing, as far as possible, the downtime related to the loading of a basket;
- be capable of being distributed inside the basket in such a way as to minimise collapses and damage to the furnace during charging and arc perforation phase;
- have a content of residual elements (Cu, Sn) compatible with the composition limits of the steel to be produced;
- have a competitive average cost given the strong influence of ferrous scrap on the finished product.

The following example gives an idea of the composition of a basket with different types of scrap, and illustrates how each category of scrap performs a useful function for the success of the casting:

Light scrap is placed on the bottom to preserve the integrity of the bottom of the furnace and reduce splashes of hot metal residue (hot heel), followed by a layer of heavy scrap (about 0.90 t/m$^3$) which is located in this lower position to avoid breakage of graphite electrodes and is covered by an average scrap layer (about 0.70 t/m$^3$). The top layer is again formed of light scrap to ensure quick perforation by the arc and protection of the roof panels.

Baskets are composed by taking the different types of scrap from the scrapyard, usually by crane, meaning that it becomes important to separate the different types of scrap and in particular identify any scrap stocks containing impurities (for example copper), since they will end up in the metal bath and will somehow have to be removed or diluted.

Currently, the scrap is transported into the steel plant by truck or container wagons, the actual mass is verified, and then classified and transported into the storage area. The wide variety of incoming material requires a grading process that is often carried out by experienced operators according to their level of seniority.

The procedure that leads to the purchase of the load requires that the full truck be weighed. The scrap is then unloaded in an area of the scrapyard and the truck is reweighed so as to gauge the tare. The price is determined on the mass difference, then on the actual material unloaded.

It is clear that in this weight a large part of suitable scrap is included, but often also a share of unsuitable scrap and other materials that are not useful or that are harmful to the melting process, such as plastics, soil, paper, and the like.

This assembly of scrap also made up of the most disparate dimensions and is often bunched into lumps, generated during transport, between materials that have been loaded with cranes and that have been bent and bound together, meaning they are not easy to untangle. Another significant part of the scrap may be too large in size to allow for easy loading into the basket.

For this reason many plants tend to use special shears with which to dissect these piles of scrap.

The problem left unresolved by all of these passages is, however, that of the purity of the scrap treated. In fact, the shears cut whatever is given to them, whether this be more or less pure iron, or whether it contains more or less important traces of other unwanted materials. The composition of this scrap is not known and a purely dimensional division can be made in the scrapyard or based at most on a more superficial visual analysis of the scrap, with the risk that even significant quantities of unwanted elements are melted, leading to a deterioration in the quality of production.

SUMMARY OF THE INVENTION

The purpose of the invention is to overcome the aforesaid drawbacks and to propose a plant and a method that makes possible a classification not only of the weight or size of the scrap, but also according to its chemical composition.

A further purpose of the invention is to provide a plant and method for the classification of scrap used by a steel plant, which is capable of composing scrap volumes for castings that are as optimised as possible and that contain minimised traces of undesirable elements, so that the quality and regulatory requirements for finished products at the end of the production process can be met. Another purpose of the invention is seen in the need to find a plant and method for the classification of a significant part of the scrap, making it possible to reduce uncertainty about the residual elements, particularly copper, used in the melting process and therefore to optimise further the management of the charge mixtures.

Other purposes and advantages of the invention will become apparent from the following description.

In a first aspect of the invention, the purpose is achieved by a plant for the classification of scrap according to its chemical composition containing:
  (a) a shear suitable for cutting scrap;
  (b) downstream of the shear, an analyser of the chemical composition of the sheared material;
  (c) means of transport for conveying said sheared material to said analyser; and
  (d) a discharge system adapted to divide the analysed material according to its chemical composition as determined by said analyser;
wherein the means of transport comprise a plurality of vibrating elements and conveyors.

Of course, the plant may also include a plurality of analysers.

These shears are usually made up of containers into which the heaps of scrap are tipped by a mechanical arm. The container is generally equipped with several movable walls and usually compresses on three axes. The side wall crushes towards the inside of the container, the lid pushes down and from the bottom through a piston the material is crushed and pushed towards the exit side.

The shear is usually placed at the exit from the compression container and has a straight or inclined blade (guillotine style, in order to distribute the effort along the cutting edge) which rises and lowers hydraulically, and as the product is pushed towards the exit it is cut into agglomerates of variable length, usually between 40 cm and 1.2 metres. To facilitate cutting, a counter-blade is often fitted on the opposite side of the shear blade. The shears are designed for slow cutting, i.e. they can make several cuts per minute (typically 300 cutting cycles per hour).

Some shears are arranged in a mobile mode on wheels or tracks so as to load material from different parts of the scrap yard; or else there are stationary shears, in which case it is the scrap that must be brought to the shear. Machine mobility is preferred when the required cutting force is low, hence in small machines. Most mobile shears have a horizontal container and are particularly suitable for working with light, low-density scrap.

Typically, a horizontal shear for cutting scrap comprises a container for loading the material and a feed cylinder to transport the scrap to an exit to unload the processed scrap which is limited by the shear cylinder with cutting blades in such a way as to cut the scrap just before the exit. Everything is controlled by a hydraulic control unit.

Alternatively, for the processing of larger and heavier scrap metal, inclined fixed shears are used, which—by exploiting the force of gravity—can dispense with the rear and even the side and/or upper cylinders and instead use the surplus oil to provide the shear with greater cutting pressure. Cutting can be facilitated by the presence of jaws that hold the material at the exit of the shear while it is being cut and between cuts. These machines generally also have hydraulically driven plugs to close the exit area of the container.

Particularly suitable is a shear with an inclined moving blade (i.e. at an angle of about 10°), combined with an inclined bottom (i.e. at about 30°), and preferably also with lateral compression elements with forces of, for example, around 560 tons, but with no thrust cylinders. The shear force also reaches values of 2,000 tons, and cutting dimensions of 1,200 mm in width and 400 to 1,200 mm in length can be obtained. Shears of this type, which work in a continuous automated form, reach a productivity level of >100 tons/hour. The scrap slides by means of gravity along the inclined bottom towards the inclined blade, bottom and blade realising an angle of about 140° between them. Lateral and vertical reducers densify the material and adapt its dimensions.

The values exemplified above, but given throughout the text, are preferred values, but in any case not exclusive.

These shears therefore allow mixed volumes of scrap to be cut into pieces or lumps of compact size, suitable for introduction into the baskets or conveyor belts of continuous castings and then into the melting furnaces.

Advantageously, the plant starts with a shear similar to those described above, preferably with a shear of the inclined container and blade category, as this allows all types of scrap to be cut and has a simplified hydraulic circuit compared to the horizontal shear. However, the concept could also be realised even with a horizontal shear or with other shears known in the art.

In an embodiment of the invention, the analyser could be located directly at the exit of the shear, in this case said means to transport said sheared material to said analyser would coincide with the means provided in the shear to transport the material to the exit. The preferred variant of the invention, however, provides that said analyser be located at a distance from the shear and for said means of transport to connect the distance between the shear and the analyser. In this case, the analyser may be arranged on or, in other words, along said means of transport or at the end of said means of transport.

Analysis of the chemical composition of the sheared scrap makes its classification possible based on the elements present and their concentration to optimise its subsequent use, and this directly during scrap shearing. The result of such an analysis could serve to carry out a pre-classification of the scrap entering the shearer, allowing further sub-classification in the plant according to the invention.

Preferably, a conveyor belt or carpet adapted to accommodate the sheared material is arranged downstream of the shear as means of transport. Said conveyor carpet can be moved by motors, or vibrate by means of, for example, an eccentric mass system, the sum of whose rotary movements generates a resultant feed. The conveyor carpet is preferably arranged below the opening of the shear container, so that the material falls upon it by means of gravity. This fall, together with the action of the conveyor and/or the vibration (in the case of a vibrating carpet), helps remove dust from the scrap. To help clean the area, a suction system can be provided around the conveyor belt. It is preferred to arrange the aspiration underneath it. Vibration also distributes the material more evenly, preparing it better for possible magnetic separation into ferrous and non-ferrous material.

In a highly advantageous embodiment of the invention, the scrap classification plant comprises, arranged between said shear and said analyser, a magnetic separator for dividing the sheared material into magnetic and non-magnetic material. In this case, advantageously, said means of transport comprise first means of transport for transporting the sheared material from said shear to said magnetic separator and second means of transport for transporting at least the magnetic material from said magnetic separator to said analyser.

In this variant, the route the scrap takes after shearing is that of undergoing separation of the magnetic materials from the non-magnetic materials, i.e. a division into a ferrous and a non-ferrous fraction. Preferably, said magnetic separator is a rotating magnetic drum system, advantageously arranged downstream of the first means of transport, for example a simple conveyor carpet or, more advantageously, a vibrating table, or the like. Preferably, the non-ferrous material is removed from a relative means of transport, on which, for example, it falls directly from the drum.

In a preferred embodiment, the diameter of the magnetic drum is larger than the minimum scrap length that can be cut from the shear. Thus, if the shear in question cuts sections of at least 40 cm, the magnetic drum will have a diameter of at least 40 cm. However, the optimum ratio is a drum with a diameter between one and two times the maximum length that can be achieved by the shear. Therefore, for 1.2 m of shearing the optimum drum has a diameter of 1.5 m. This is because one dimension, that of the opening of the shear mouth, remains equally fixed at between 1 and 1.5 m.

A preferred system for preparing and classifying scrap for melting is therefore composed of a shearing assembly, preferably with a shear with inclined blade and bottom, a unit for separating inert, powdery and non-ferrous materials from ferrous materials, and an analysis unit for determining the chemical composition of the separated ferrous material, at least as regards some elements.

In a further alternative embodiment of the invention, the plant provides a third means of transport adapted to transport the sheared material directly to the analyser, bypassing the magnetic separator. Alternatively, it is conceivable to move the magnetic separator with respective moving means out of the process flow and close the gap formed, for example, with a chute, or the like.

This embodiment is appropriate in the event that the scrap loaded into the shear can also be of considerable size and weight and therefore practically pure. To react in the plant to different sizes and weights of the scrap, it is useful to provide a measure to exclude the magnetic separator from service and replace it by alternative means. In fact, the large material and/or weights could not be lifted and could get stuck in the separator, causing it damage.

The means of transport may include, in the case of a second means of transport after the magnetic separator, a conveyor belt of the radial/swinging type, i.e. one capable of moving around the radius of a circle, the centre of which corresponds to the point of scrap loading, making it possible to create different destinations for the transported material depending on the angle of rotation. If the analyser is located upstream of the radial conveyor, the destinations may correspond to different fractions of materials with a different chemical composition. A radial conveyor can act as a discharge system. The transport system is preferably of the inclined type and raises the material from a charging point located at the bottom, tipping it onto piles arranged below the perimeter along which it can rotate. Each of said piles is characterised by its being uniform from the point of view of the composition of the material contained therein. The second means of transport may then coincide with the discharge system adapted to subdivide the material analysed according to point (d).

Otherwise, the radial conveyor can be used to direct the flow of material either to the next analyser or to a destination that does not require analysis, as desired.

Alternatively, the discharge system can be realised by a conveyor belt, preferably inclined, which feeds multiple dual track belts. Both solutions are disclosed in more detail with reference to two exemplary embodiments illustrated in FIGS. 1 and 2. These types of means of transport allow the sheared material to be unloaded and separated into separate fractions, and then placed, according to the chemical composition determined in the analyser, preferably arranged on these second means of transport, or alternatively on a third means of transport. Another solution for a discharge system is a swivel chute, as described later with reference to FIG. 3.

Preferably, the means of transport (first and/or second) comprise vibrating feeders for distributing the material uniformly on said means of transport. Advantageously, the means of transport further comprise weighing means. In a highly preferred variant of the invention, the speed of the means of transport is adjustable so as to allow it to be adapted to the needs of the analyser according to the measurement times.

The means of transport, in particular the second, are advantageously a composition of several vibrating elements and inclined conveyors, i.e. arranged in a cascade, to optimise the precise and fine adjustment of the flow according to the analyser's needs.

Preferably, the means of transport comprise a conveyor, advantageously inclined, on which the analyser is located, preferably followed by a further faster conveyor, at all times forming part of the means of transport, which conveys the analysed material to the discharge system adapted to separate different fractions of material based on the results transmitted by the analyser.

Two particularly suitable embodiments for preparing the material for analysis are defined in the present application, and related exemplary embodiments are described below with reference to FIGS. 3 and 6. The inventors combined a plurality of vibrating feeders and conveyors in a given order that was shown to be particularly suitable for the purpose. Particularly advantageous were the lengths chosen for the individual elements. An important role was also played by the inclinations of said individual elements: horizontal (parallel to the plant floor), ascending (inclining upward in the direction of transport), descending (sloping downward in the direction of transport) or cascading (the beginning of one means of transport is below the end of the previous means of transport).

Analysers of the type mentioned above are in particular able to detect the elements Cu, Sn, Zn, P, Mo, Ni, Cr and Mn and to classify the material not so much according to the iron content, as to the presence of impurities.

In another embodiment of the invention, a system for weighing the material from the shear previously purified as far as possible of non-magnetic contamination is provided at the point of scrap loading. Such weighing system can, for example, use load cells or calibrated springs, and this measurement, together with the belt conveying speed data, allows the flow rate of the material to be calculated over time. In addition to weight, each pile is characterised by the presence or absence of a certain chemical element or threshold of said element.

Taking copper and tin as an example of application, which are undesirable components in melting, one can have, for example, piles of scrap with a composition of copper and/or tin of less than 0.2%, less than 0.4%, 1%, and so on. In an advantageous variant of the invention, classification of the materials results in fractions characterised by a copper content of <0.20% (m/m), 0.20-0.35% (m/m) and >0.35% (m/m) respectively. This makes it possible to make more informed compositions of scrap feeds for the melting process.

In order to obtain this separation, it is necessary to be able to analyse the composition of the scrap that is preferably treated in transit, i.e. "online", along the means of transport. In this regard, the plant according to the invention provides a chemical analyser. Preferably, it is an XRF analyser, a LIBS analyser or a neutron activation analyser, preferably a neutron activation analyser, in particular a PGNAA system.

X-ray fluorescence spectroscopy (XRF) is an X-ray emission spectroscopy technique, which allows the identification of chemical elements that are present in, or make up, the sample being examined. The principle used is as follows: using X-radiation of the appropriate energy and intensity it is possible to create a vacancy in an inner shell of an element's atom. This position is subsequently reoccupied by an electron belonging to one of the outermost shells, which in de-excitation produces a photon that has an energy equal to the difference between the energies of the electron in the initial and final positions. Such a technique would advantageously be used not locally (by analysing the material composition instantly/locally), but by integrating the composition information for a given mass of scrap. The characteristic peaks of various elements are clearly distinguished in the emission spectrum. The technique is not destructive, but provides information only about the surface composition of the scrap.

A Laser Induced Breakdown Spectroscopy (LIBS) analyser uses a short pulse of a laser to create a micro-plasma on the surface of the sample, and ablation of a small volume of the sample mass occurs. The light emitted from the plasma is collected and analysed by a spectrograph. Each element of the periodic table is associated with specific spectral peaks.

The analyser, for example, arranged along the section of an inclined conveyor, then examines the flows of sheared material that pass under it and counts the different chemical composition elements. A penetrating light emitter can be placed below (or above) the material and a receiver is installed on the opposite side. The state of the art and the market offer a wide range of analyser systems that can be used for this purpose and hence do not require a more detailed description here.

An exemplary operation of the system is as follows: When, on the basis of the data regarding the speed of the conveyor and the weight of the material or, after a given period of time, a certain quantity of material has passed under the analyser (i.e. one ton), the counting ends and, depending on the results thereof, the amount examined is discharged into the most suitable pile in terms of commonality of elements. Since the measurement has a minimum duration (i.e. one minute), it is necessary to wait for a certain amount of scrap to pass.

The discharge system suitable for dividing the analysed material according to its chemical composition determined by said analyser is therefore advantageously a combination of means of transport suitable for depositing the outgoing material in different positions, weighing means and a control unit, which calculates the flow rate from the weights and divides the material flow into portions of certain weights, also characterising them chemically with the data received from the analyser in order to direct them through the command of the means of transport into different piles/fractions.

To aid reading and analysis of the material, it is advisable for the layer under analysis to be of reduced height and superimposed as little as possible. For this reason, it is advisable to have systems in the means of transport upstream of the analyser so as to "comb" the material, such as blades or spikes, and untangle it as said systems pass through the material. As the material is smaller in size after shearing, it is easier to process with this system.

Alternatively, the same means of transport may be provided with embossed elements adapted to perform this task while transporting the material to the analyser.

In a preferred embodiment of the invention, on the other hand, said first and/or second means of transport are provided with tables, belts and/or vibrating feeders. Such vibrating elements help to homogenise material distribution or, in other words, to transform a non-constant material flow into a constant flow more suitable for chemical analysis as well as for magnetic separation. A vibrating element compacts the material in the sense of closing the gaps that form between one batch and the next.

The market offers a wide range of vibrating elements, which usually have a plane with abrasion-resistant sides and vibrating motors underneath the plane.

Very advantageously, said analyser is located on said means of transport, in particular on said second means of transport in the event that a magnetic separator is present. This allows analysis both on-site and during transport to the destination, saving time and providing information on the material's destination before it is deposited.

Very advantageously, a neutron activation analysis system can also be used for this purpose, in particular Prompt Gamma Ray Neutron Activation Analysis (PGNAA) or Pulsed Fast Thermal Neutron Activation (PFTNA).

Instantaneous or prompt gamma-ray analysis by neutron activation is a non-contact and non-destructive analytical technique that can be used in online analysis systems to determine the chemical composition of bulk materials.

Neutrons interact with the elements in the bombarded materials, which then emit measurable gamma rays. Each element emits a photon of characteristic energy when it returns to a stable state after excitation caused by the absorption of a neutron into the nucleus. When a thermal neutron, or rather a low energy neutron (<0.025 eV), approaches or collides with the nucleus of an atom, an interaction occurs between the neutron and the nucleus. The atom then absorbs a neutron and increases the mass number by +1 passing to the excited state. During its de-excitation, the atom emits a photon in the range of gamma rays that is characteristic of each element. The photon is called "prompt" as it is emitted at the instant of the nuclear reaction.

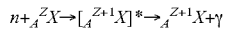

$$n + {}_A^Z X \rightarrow [{}_A^{Z+1} X]^* \rightarrow {}_A^{Z+1} X + \gamma$$

The emitted gamma ray has a distinct energy associated with the atom from which it was released. In essence, the gamma ray emitted is like a "fingerprint" of the element. The emitted gamma rays are detected and an energy spectrum is generated that gives information about the elements present and their quantity.

PGNAA and PFTNA online analysers detect gamma rays using scintillation detectors, for example. These detectors consist of a high-purity crystal structure which, when exposed to gamma rays, produces photons proportional in energy to the energy of the gamma rays entering the crystal. A photo-multiplier tube coupled to the crystal converts light pulses into electrical signals. The electrical pulses produced are amplified and analysed to obtain information on specific elements. The state of the art knows several alternative detectors that the expert can easily identify.

The neutron activation process is a radio-analytical method that can identify in any sample, whether in a solid, liquid or gaseous state, practically all the elements of the periodic table, but with limits of detectability and quantification of the element that are not the same for all elements.

From the photon energy emitted, the qualitative result is obtained (identification of the element present), while from the photon count of this energy the quantitative result is obtained (the quantity of the element present in the scrap). The result is expressed in an energy spectrum that represents the "count" of photons as a function of energy with a peak for each element.

The neutrons used in the analysis technique are provided either by a radioisotope, often Californium 252 ($^{252}$Cf), or by a neutron generating system. The radioisotope undergoes spontaneous fission and produces neutrons which are used in the analysis process. The neutrons of a neutron generator are produced electrically in an accelerator. Compact solutions already on the market can be used as neutron sources. These consist of small accelerators that use the nuclear fusion reaction of deuterium-deuterium (D+→n+$^3$He) to produce 2.5 MeV neutrons or deuterium-tritium (D+T→n+$^4$He) to produce 14.5 MeV neutrons. Through materials called moderators (such as water, heavy water or graphite) or collisions of the neutrons themselves with the sample, it is possible to reduce the speed of the neutrons to the point of their thermalisation (energies of about 0.025 eV). The use of these types of sources (compared to the more common source $^{252}$Cf) makes it possible to create a pulsed beam, while the radioisotope produces a continuous neutron flux.

While dangerous radioactive isotopes create a continuous neutron flux, the system based on the above reactions generates neutrons electrically in a pulsed manner, allowing the gamma-ray detector to differentiate between neutron-nucleus interactions. A high frequency pulse can only be obtained with an electric neutron source.

An electrically operated system ensures the highest level of safety, where neutron emission can be shut down, thus lowering the exposure of the user of the analytical system. Increased neutron energy brings with it a number of analytical benefits. The most important is the ability to analyse carbon and oxygen as well. Higher neutron energy also results in an overall improvement in sensitivity. The ability to handle broad mass variations in the activation zone and independence of particle size are some added advantages of PFTNA-based analysers.

Gamma-activated chemical neutron analysers penetrate the entire cross-section of the material analysed, providing uniform measurement of the entire material, not just its surface. Surface analysis technologies such as XRF, LIBS, X-ray diffraction, and other spectral analysis technologies, measure limited depths and surfaces that may not be representative of the entire amount of material. They require multiple sensors, but have greater accuracy and integration time.

The usefulness of neutron activation techniques lies in a number of special features, listed below:
- Simultaneous qualitative identification of several elements (position of the peak in the energy spectrum) and (at least approximate) assessment of the quantity (scaled area of the peak).
- A non-destructive technique, which does not require direct contact with the sample or the collection of a portion of the sample, hence the sample analysed is not damaged. Time-consuming sample preparation is also avoided.
- Not being a charged particle, the neutron can penetrate more into the target material as it is not affected by Coulombic repulsion. This distinguishes it from XRF, LIBS and hyperspectral imaging techniques, which perform only a surface analysis.

A problem with neutron activation analysis is that neutrons emitted from the neutron source also excite materials outside the material to be analysed, which in turn generate gamma rays the presence of which is identified by the detectors. To counteract this phenomenon, different shields for capturing neutrons are advantageously provided within the measurement system, so that neutron radiation preferably affects only the material to be measured and therefore no "extraneous gamma rays" are generated that contaminate the gamma rays desired. Shielding materials may consist of plastics with neutron poisons such as boron or lithium. The choice of shielding thickness makes it possible to adjust the attenuation of neutrons, by a factor of 8, for example. The use of lithium or boron epoxy resin coatings is also useful. Patent specification U.S. Pat. No. 8,138,480 B2 provides possible shieldings and solutions, such as determining the composition of bulk material directly on conveyor belts.

The chemical composition may be expressed in percentage ratios or, if information on material flow rate is available, it may be expressed in absolute values, indicating mass, molar, or weight values.

In the literature, it is possible to find estimates of the concentration limits of the various elements of the periodic table that can be measured using this technology by analysing the sample for several minutes (i.e. 10 minutes). Detection levels of <0.01% are reported for nickel; 0.01-0.1% for iron, chromium, copper and sulphur; 0.1-0.3% for aluminium and silicon; and 0.3-1% for molybdenum; while a value of 3-10% is found for tin at a measurement time of 10 min. The elements of most interest in scrap analysis therefore generally show a good level of detectability.

The system according to the invention provides information on the qualitative and quantitative composition of the scrap, providing a key advantage:

Compared to the regulatory limits, the measured chemical composition can prove that the input material exceeds, or does not exceed, the contents required by the relevant EU legislation, making possible the classification of the material also for the purpose of composing mixtures of different scrap fractions for the melting furnace or an oxygen converter for the Linz-Donawitz process. This provides a means for modifying the material in the basket to adjust and correct the metal and non-metal content through dilution.

A second aspect of the invention relates to a method for the classification of scrap, which comprises the following phases:

(I) shearing of scrap;
(II) analysis of the chemical composition of the sheared material; and
(III) division of the material analysed into fractions according to the chemical composition determined in phase (II), wherein, prior to its analysis, the scrap is transported on a plurality of vibrating feeders and conveyors.

Advantageously, the division in phase (III) takes place with the respective management of discharger means of transport that create different fractions of sheared scrap according to the determined chemical composition and—if determined—according to the flow rate. Otherwise, it is possible to divide the transported material into sections that correspond to certain periods of advancement of the means of transport.

The analysis is preferably carried out by XRF, LIBS or neutron activation methods, as described above for the plant according to the invention, and preferably during its transportation.

Advantageously, if the incoming scrap is of reduced size and weight, between phase (I) and phase (II) a magnetic separation of the sheared material takes place to divide it into a magnetic fraction and a non-magnetic fraction, and in phase (II) only the magnetic fraction is analysed, while the non-magnetic fraction is discarded. In this way, much of the purely non-ferrous material is discarded. Based on information regarding the size and weight of the scrap, which can be obtained from weighing or visual checks, for example with cameras, it is possible to direct the sheared material to a route involving magnetic separation or to a bypass route.

Preferably, the fractions created during application of the method by always accumulating within them portions of sheared scrap of similar chemical composition comprise different amounts of iron and/or undesirable elements in the steel, such as copper.

Prior to being analysed, the material is preferably subjected to vibration, in particular to inclined transport, and to certain speed conditions, to adapt the material to the requirements of the analyser, in particular, to react to the required measurement times, preferably in a plant according to the invention. The combination of different conveyors of certain lengths is also helpful in this regard.

With the plant and method for the classification of scrap according to the invention, it is possible to determine the chemical composition of large quantities of bulk material—in the order of tens of tons—in a short time—in the order of a few minutes—to be able to classify and separate it.

Preferably, the analysis takes place along the means of transport that remove the sheared scrap from the shear. In a preferred variant of the invention, the division in phase (III) takes place by directing a means of transport downstream of the analyser in such a way as to deposit portions of sheared scrap of the same or at least similar chemical composition in the same fraction. For this purpose, it is useful to use radial conveyor belts or dual track multiple conveyor belts or swivel chutes.

The features and advantages disclosed for one aspect of the invention may be transferred mutatis mutandis to the other aspect of the invention.

The industrial applicability is obvious from the moment it becomes possible to classify the sheared scrap according to regulatory aspects based, for example, on the content of iron and/or tramp or trace elements, in particular copper, and consequently the targeted handling of the composition in baskets intended for use in a smelting furnace or similar.

Said objects and advantages will be further highlighted during the disclosure of preferred embodiment examples of the invention provided by way of example only.

Variant and further features of the invention are the object of the dependent claims. The description of the preferred exemplary embodiment of the plant and the method for the classification of scrap according to the invention is given by way of non-limiting example only with reference to the attached drawings. In particular, unless specified otherwise, the number, shape, dimensions and materials of the plant and of the individual components may vary, and equivalent elements may be applied without deviating from the inventive concept.

DETAILED DESCRIPTION

Figure 1:
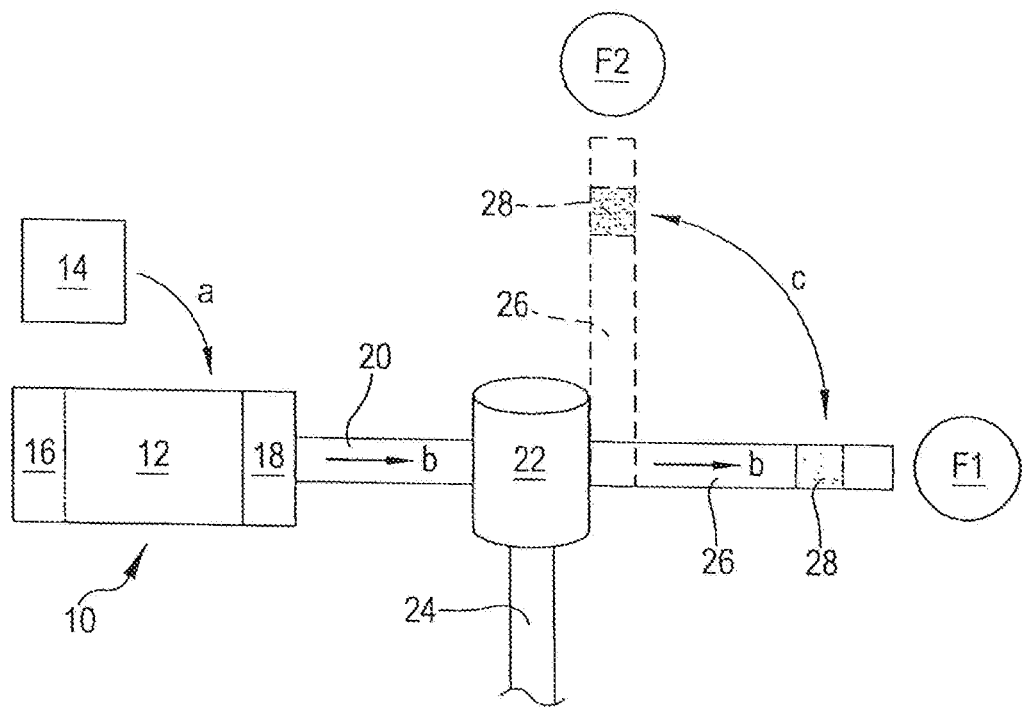
FIG. 1 illustrates in a block diagram the concept of a plant for the classification of scrap according to the invention.

In FIG. 1, the concept of a scrap classification plant according to the invention is presented in a block diagram. A, for example horizontal, shear 10 includes a container 12 which, following the arrow a, can be loaded with scrap by means of a device 14, such as a crane. The shear 10 provides pushing devices 16 to advance the scrap (not represented) towards the cutting device 18 at the exit of the shear 10. Alternatively, an inclined shear can also be used, as described above. The sheared material (not shown) leaves the shear 10 on the conveyor belt 20 facing a magnetic drum 22 for the magnetic separation of the material. The separated non-magnetic material is deflected from the plant on a conveyor belt 24, while the magnetic material continues in the flow direction b of the material on a further conveyor belt 26 equipped with an analyser 28 that analyses the chemical composition of the material directly on the conveyor belt 26.

The magnetic drum 22 attracts the ferromagnetic scrap to itself, then tipping it into a chute (not shown) on the side opposite the magnetic drum and directing it to the belt 26. Not being attracted by the drum 22, the non-magnetic materials fall from the conveyor belt and end up in a hopper (not shown), culminating in a second conveyor belt 24 suitable for sending them to a special pile not to be used in melting.

Based on the data received from the analyser a control unit, for example located in the analyser itself, identifies the type of scrap currently present on the belt in a given section and classifies it into relative fractions F1 and F2. Depending on the type of fraction detected, the control unit commands the conveyor belt 26 to change its position (between the position indicated with solid lines and the position with dashed lines) following the arrow c, to deposit the incoming material on the pile corresponding to the determined fraction F1, F2. This is a very simplified system that combines means of transport and discharge system in a radial conveyor, which can of course be implemented in such a way that the means of transport are followed by a discharge system.

Figure 2:
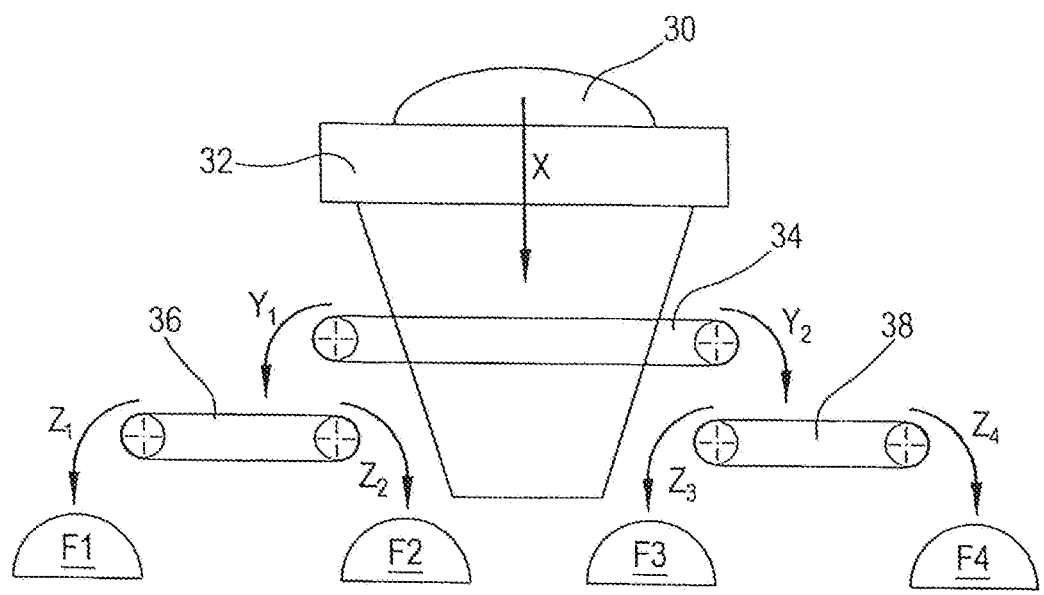
FIG. 2 illustrates a variant of means of transport downstream of the shear for physically dividing the different fractions of the sheared and analysed material.

FIG. 2 illustrates a variant of means of transport and discharge system downstream of the shear for physically dividing the different fractions (from F1 to F4) of the sheared and analysed material that replaces the belt 26 of FIG. 1 (but also includes an analyser, not shown). In this case, a control unit (not shown) directs sheared and analysed material 30 arriving on a non-rotatable inclined conveyor belt 32, when it has been placed (arrow x) on the dual track conveyor belt 34 by choosing the direction of advancement of the belt 34, depending on the chemical composition of the material 30, on the following dual track belt 36 or 38 (arrows $y_1$ and $y_2$), from where the material comes, always setting the relative direction of movement of the respective belt 36, 38, directed towards the respective pile containing the fractions F1 to F4 (arrows $z_1$, $z_2$, $z_3$, $z_4$). The criterion for determining whether sheared and analysed material belongs to one or the other fraction may be the iron content and/or the presence of undesired elements.

Details regarding suitable shears, suitable means of transport and usable magnetic separators can be found in the exposition of the invention. The way of loading the shear can also vary as described above, as of course can the number of fractions. It is also conceivable not to deposit the fractional material in the scrapyard, but to transport it directly to different plants (e.g. a melting furnace), where it can be used, or to load it onto a wagon or truck to transport it elsewhere. The means of transport may be composed of various types of conveyors and, advantageously, also comprise vibrating feeders, or the like.

Figure 3:
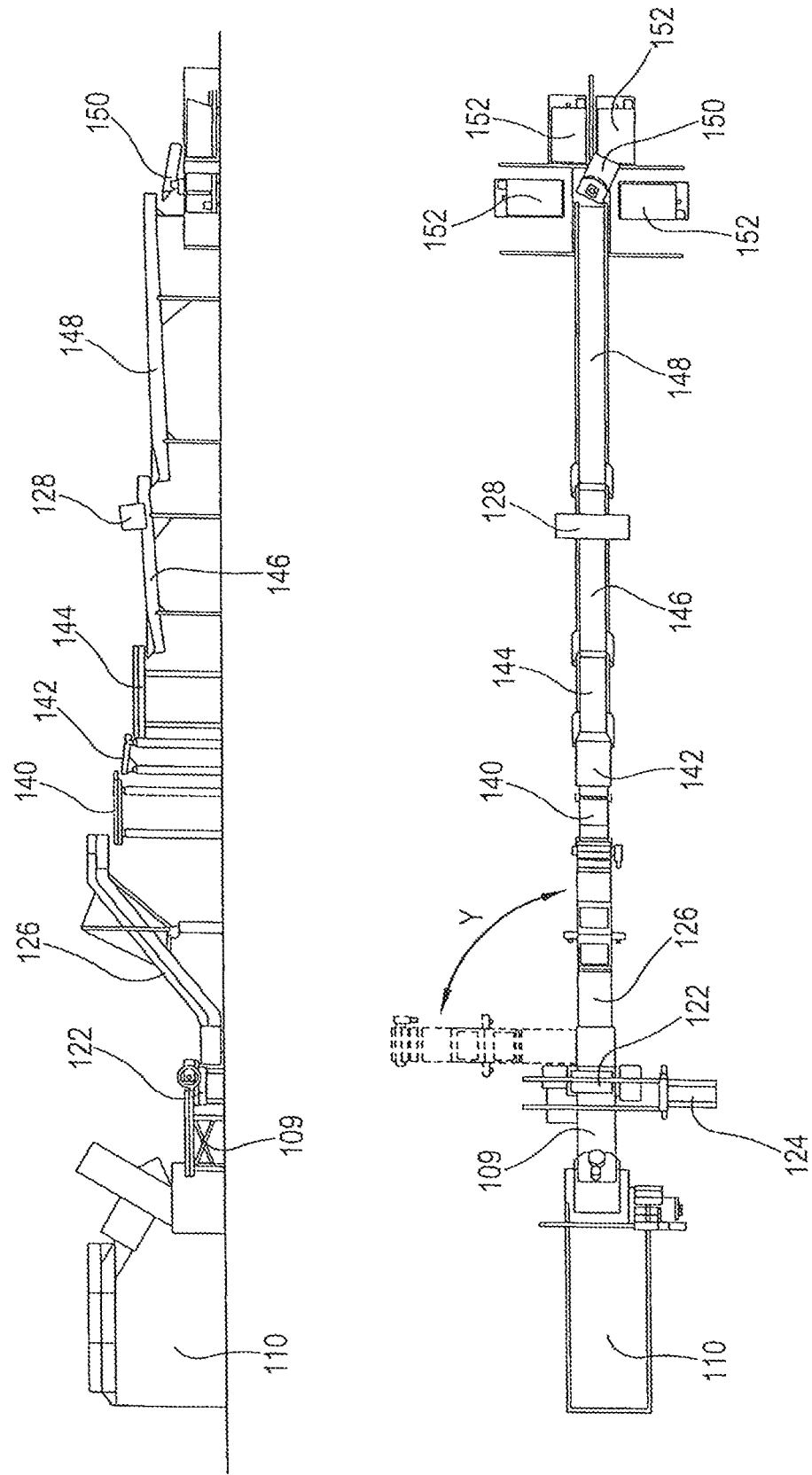
FIG. 3 illustrates a detailed embodiment of a scrap classification plant according to the invention, above in a side view and below in a top view.

FIG. 3 illustrates a preferred embodiment of the scrap classification plant that provides for an inclined type shear 110, followed by a vibrating table 109 to homogenise the sheared material and prepare it for magnetic separation in the following permanent magnet magnetic drum 122 (i.e. with a diameter of 1,220 mm and a width of 2,100 mm). The non-ferrous material is removed by a conveyor 124. Downstream of the drum 122, a radial conveyor 126 is arranged for transporting the ferrous material to the analyser or depositing it on the ground, depending on the position assumed with a rotation in the direction of the arrow y. From the radial conveyor 126 the ferrous material falls onto a first vibrating feeder 140 and from there onto a second vibrating feeder 142 which further reduces the height of the material and homogenises its distribution. This is followed by a conveyor 144 that transports the material to an inclined conveyor 146 equipped with the analyser 128 that determines the composition of the material online. After the passage of the analyser 128, the analysed material falls onto a fast conveyor 148 that deposits the material by means of gravity onto a swivel chute 150 which, on the basis of the values received from the analyser controller 128, pours the material divided according to different concentrations of certain metals, in particular copper, into different containers 152. The lengths of the conveyors and feeders can vary from a few meters, for example, approximately 2.75 meters for the first feeder, up to 20 meters for the fast conveyor. The lengths are chosen by the expert based on the timing and degrees of uniformity of the material required by the analyser. The adjustable speed of the means of transport, their inclination and the weighing of the transported material also help to optimise analysis time.

Figure 4:
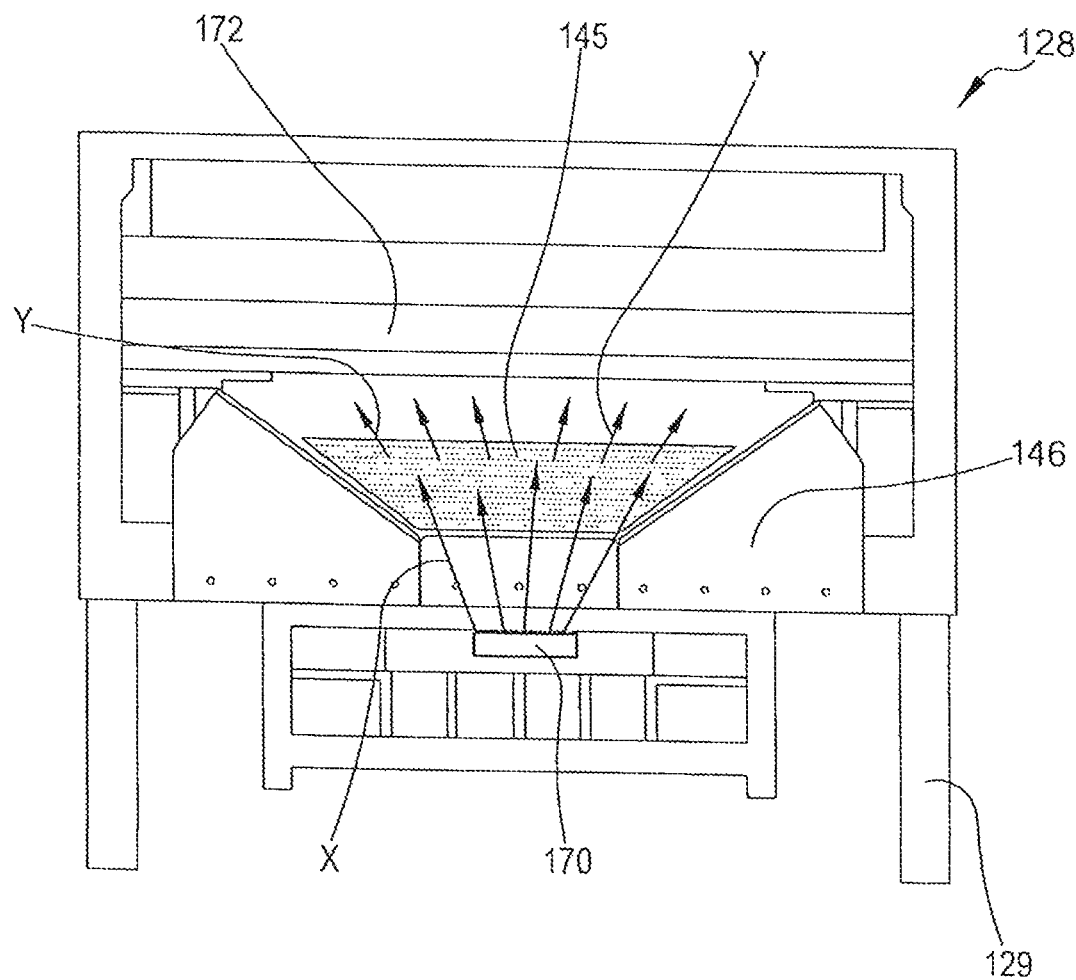
FIG. 4 illustrates the analyser located on the means of transport as shown in FIG. 3.

FIG. 4 illustrates the analyser 128 located on the means of transport 146 carrying the ferrous material 145, as shown in FIG. 3. A frame 129 supports a neutron source 170 that emits neutrons (arrows x) that penetrate the ferrous material 145 which in turn emits rays (arrows y) that are identified by the detectors 172 and analysed in the analyser control unit.

The containers 152 can be movable, advantageously positioned on weighing tables. The containers thus filled are well defined in terms of chemical composition and weight and can be sent to the corresponding baskets to feed the melting furnaces.

For example, in the arrangement of the containers in FIG. 3, it is possible to obtain copper fractions with >0.30% (m/m), 0.20-0.30% (m/m) and with <0.20% (m/m) copper. The analysis system integrates the concentration of the element detected punctually providing the total average concentration for each container set within the desired limits.

Figure 5:
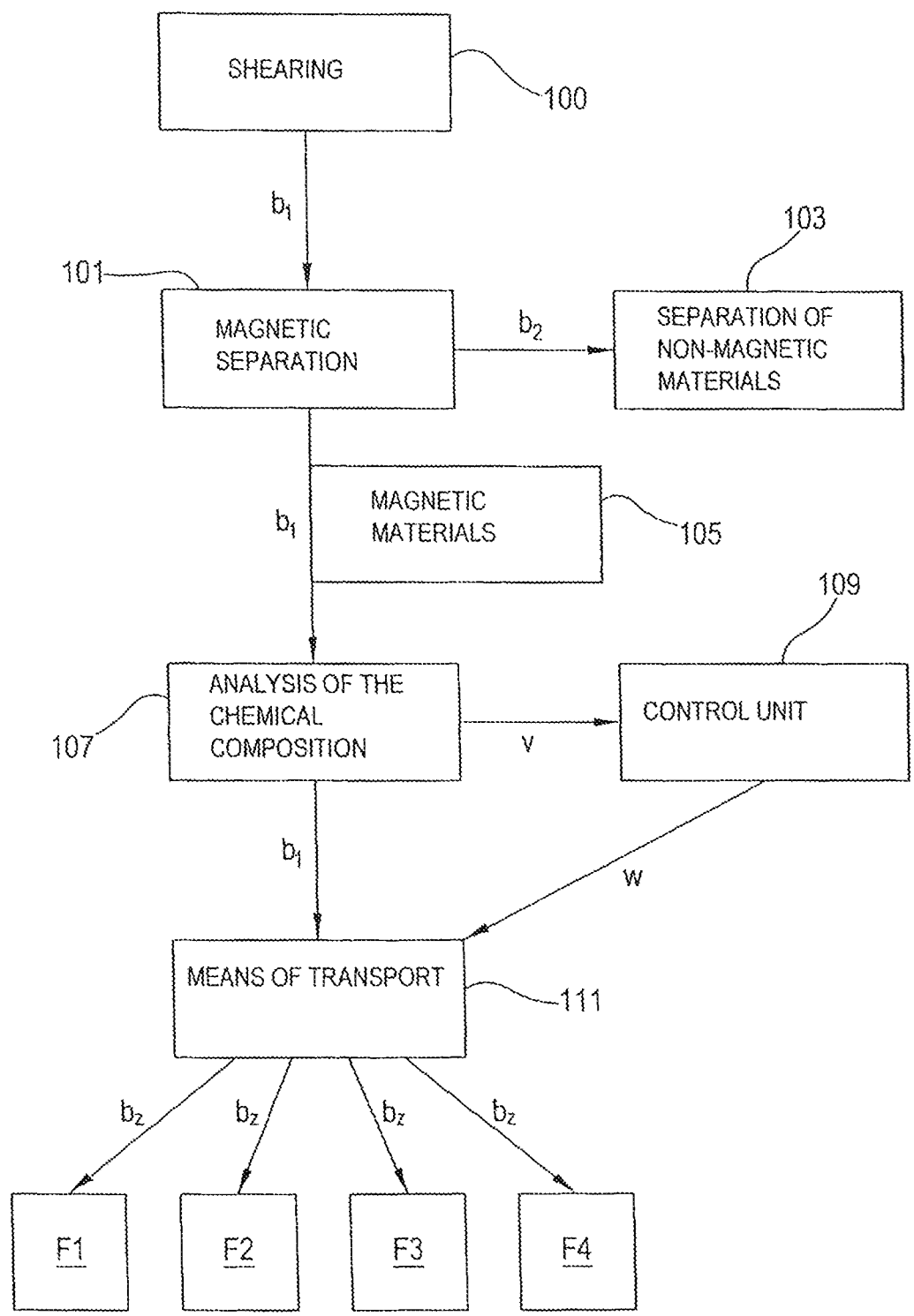
FIG. 5 illustrates, in a block diagram, an embodiment of the scrap classification method according to the invention.

FIG. 5 illustrates, in a block diagram, an embodiment of the scrap classification method according to the invention. The scrap shearing 100 phase is followed by magnetic separation 101 of the sheared material by separating the non-magnetic material 103 (arrow $b_2$) from the main material flux $b_1$. The magnetic materials 105 continue to be analysed with respect to their chemical composition 107. The detected data reach (arrow v) a control unit 109 that determines whether the analysed material belongs to a respective fraction and commands the means of transport 111 that have been fed along the main flux direction $b_1$ so that they direct the material (flows $b_z$) to different piles corresponding to different fractions F1, F2, F3, F4. In this regard, rotatable conveyor belts (as shown in FIG. 1), or dual track multiple conveyor belts (as shown in FIG. 2), or swivel chutes as shown in FIG. 3, or other equivalent means, may be useful. The person skilled in the art will be able to find other solutions to discharge and separate the material.

Figure 6:
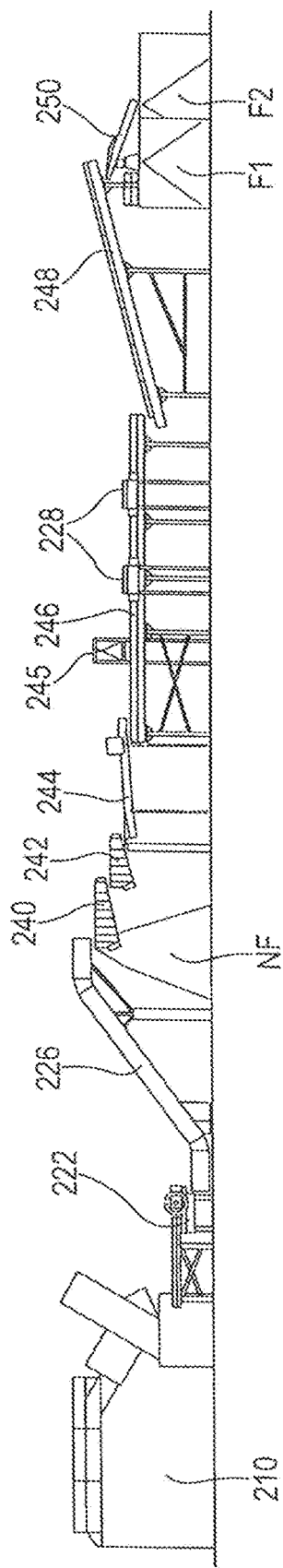
FIG. 6 illustrates another detailed embodiment of a scrap classification plant according to the invention in a side view.

FIG. 6 illustrates another detailed embodiment of a scrap classification plant according to the invention in a side view. A shear 210 and a magnetic drum 222, in particular with a permanent magnet (not shown), are arranged upstream of the radial conveyor 226. The radial conveyor 226 carries the ferrous material to the analysers 228 or deposits it in a pile NF in a surrounding area. From the inclined radial conveyor 226 (in the direction of the analysers), the ferrous material falls onto a first horizontal vibrating feeder 240 and from there onto a second horizontal vibrating feeder 242 which further reduce the height of the material and homogenise its distribution. There follows a horizontally arranged conveyor 244 that conveys the material to a further horizontal conveyor 246 equipped with two analysers 228 that determine the composition of the material online. Systems 245 are arranged at the beginning of the conveyor 246 for blocking bulky parts and/or weighing. After the passage of the analysers 228, the analysed material falls onto a conveyor 248, which at high speed deposits the material by means of gravity onto a swivel chute 250 which, based on the values received from the analyser controller 228, pours the material divided according to the target concentration levels of certain metals, particularly copper, into different F1, F2 piles.

The lengths of the conveyors and the feeders of the embodiments shown in FIGS. 3 and 6 are in exemplary form in the following ranges: 14-18 m for radial conveyors; 4-6 m for the first vibrating feeder; 2-4 m for the second vibrating feeder; 5-7 for the conveyor connecting to the conveyor with the analysers which in turn has a length of between 10 and 30 m; 16-22 m for the fast conveyor; and 6-8 m for the swivel chute.

In execution phase, parts may be added to the plant and method for the classification of scrap covered by the invention, and/or further modifications or variations may be made to the plant and method for the classification of scrap which are not described, without departing from the purpose of the invention. If such modifications or such variants should fall within the scope of the following claims, they should all be considered protected under the present patent. In practice, the materials used, as well as dimensions, numbers and shapes, may be different, according to requirements, as long as they are compatible with the specific use and unless otherwise specified. Although the present invention has been described with reference to specific examples, those skilled in the art will certainly be able to produce many other equivalent forms of plants and methods of analysis having the features expressed in the claims and therefore all falling within the scope of protection defined therein.

The invention has achieved the purpose of proposing an effective plant and method for the classification of scrap exiting a shear in such a way as to obtain fractions separated by certain criteria pertaining to their chemical composition, thus allowing, inter alia, production of optimised and targeted scrap mixtures destined for melting furnace baskets, in particular with regard to copper content, which makes it possible to identify larger portions with a low copper content.

The invention claimed is:

1. A plant for the classification of scrap comprising the following machinery arranged and directly connected to each other in the following order:
    a shear,
    a vibrating table,
    a drum magnet,
    a radial conveyor for transporting ferrous material separated from the drum magnet to an analyser of chemical composition of sheared material or for depositing non-ferrous material in a surrounding area,
    a first vibrating feeder,
    a second vibrating feeder,
    a first conveyor,
    a second conveyor equipped with the analyser,
    a third conveyor, and
    a swivel chute,
wherein the lengths of the conveyors and feeders comprise from 2 m for the first feeder to 40 m for the third conveyor, and wherein the shear comprises an inclined shear.

2. The plant for the classification of scrap according to claim 1, wherein said radial conveyor inclines upwards or is ascending, that said third conveyor inclines upwards or is ascending, that said first vibrating feeder, said second vibrating feeder and said first conveyor are arranged in a cascade, that said first conveyor is horizontal, that said swivel chute slopes downwards or is descending, and
    (I) that said first feeder, said second feeder, and said second conveyor are horizontal; or
    (ii) that said first feeder and said second feeder slope downwards or are descending and that said second conveyor inclines upwards or is ascending.

3. The plant for the classification of scrap according to claim 1, wherein lengths of the conveyors and feeders are: 14-18 m for the radial conveyor; 4-6 m for the first vibrating feeder; 2-4 m for the second vibrating feeder; 5-7 m for the first conveyor; 10-30 m for the second conveyor; 16-22 m for the third conveyor; and 6-8 m for the swivel chute.

* * * * *